United States Patent
Buchner et al.

(10) Patent No.: US 11,470,389 B2
(45) Date of Patent: Oct. 11, 2022

(54) METHODS AND SYSTEMS FOR CONTEXT-SENSITIVE MANIPULATION OF AN OBJECT VIA A PRESENTATION SOFTWARE

(71) Applicant: THE BOSTON CONSULTING GROUP, INC., Boston, MA (US)

(72) Inventors: Tilman Buchner, Munich (DE); Martin Egbert Kleinhans, Munich (DE); Johannes Boyne, Munich (DE)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 17/647,304

(22) Filed: Jan. 6, 2022

(65) Prior Publication Data

US 2022/0210506 A1 Jun. 30, 2022

Related U.S. Application Data

(62) Division of application No. 17/101,873, filed on Nov. 23, 2020, now Pat. No. 11,272,250.

(51) Int. Cl.

| | |
|---|---|
| *H04N 21/443* | (2011.01) |
| *G06F 16/955* | (2019.01) |
| *H04L 67/025* | (2022.01) |
| *H04N 7/15* | (2006.01) |
| *H04N 21/2343* | (2011.01) |
| *H04N 21/431* | (2011.01) |
| *H04N 21/8549* | (2011.01) |

(52) U.S. Cl.
CPC ..... *H04N 21/4431* (2013.01); *G06F 16/9566* (2019.01); *H04L 67/025* (2013.01); *H04N 7/15* (2013.01); *H04N 21/2343* (2013.01); *H04N 21/4318* (2013.01); *H04N 21/8549* (2013.01)

(58) Field of Classification Search
CPC ............ H04N 21/234; H04N 21/2343; H04N 21/4318; H04N 21/431; H04N 21/8549; H04N 21/854; H04N 21/4431; H04N 21/443; H04N 21/15; G06F 16/955; G06F 16/9566; H04L 67/02; H04L 67/025
See application file for complete search history.

(56) References Cited

U.S. PATENT DOCUMENTS

| | | |
|---|---|---|
| 5,572,643 A | 11/1996 | Judson |
| 6,185,586 B1 | 2/2001 | Judson |
| 6,268,856 B1 | 7/2001 | Bruck et al. |
| 6,271,843 B1 | 8/2001 | Lection et al. |

(Continued)

FOREIGN PATENT DOCUMENTS

| WO | WO-2016102175 A1 * | 6/2016 | ............. G05B 19/05 |

OTHER PUBLICATIONS

U.S. Appl. No. 17/101,873, filed Nov. 23, 2020, Pending.
(Continued)

*Primary Examiner* — Jenee Holland
(74) *Attorney, Agent, or Firm* — DLA Piper LLP (US)

(57) ABSTRACT

Methods and systems for context-sensitive manipulation of an object via a presentation software are disclosed. A target object state can be obtained. An actual state of the object can be determined to be different from the target object state. The actual state of the object can be manipulated to synchronize with the target object state.

18 Claims, 17 Drawing Sheets
(7 of 17 Drawing Sheet(s) Filed in Color)

(56) References Cited

U.S. PATENT DOCUMENTS

| | | | |
|---|---|---|---|
| 6,304,651 B1 | 10/2001 | Cramer et al. | |
| 6,314,569 B1* | 11/2001 | Chernock | H04N 21/431 |
| | | | 715/723 |
| 7,107,537 B2 | 9/2006 | Abu-Husein | |
| 7,865,394 B1 | 1/2011 | Calloway et al. | |
| 7,953,777 B2 | 5/2011 | White et al. | |
| 8,795,090 B2* | 8/2014 | Link | A63F 13/52 |
| | | | 463/43 |
| 9,858,694 B1* | 1/2018 | Das | G06T 11/203 |
| 10,122,660 B2 | 11/2018 | Brandenburg et al. | |
| 2002/0008703 A1* | 1/2002 | Merrill | G06F 8/00 |
| | | | 345/473 |
| 2002/0051493 A1 | 5/2002 | Shin et al. | |
| 2002/0095522 A1 | 7/2002 | Hayko et al. | |
| 2002/0103817 A1* | 8/2002 | Novak | G06F 9/451 |
| 2003/0071833 A1* | 4/2003 | Dantzig | G06F 3/038 |
| | | | 715/700 |
| 2004/0157664 A1* | 8/2004 | Link | A63F 13/48 |
| | | | 463/43 |
| 2004/0243627 A1 | 12/2004 | Jensen et al. | |
| 2005/0080878 A1 | 4/2005 | Cunningham et al. | |
| 2007/0015458 A1 | 1/2007 | Corbett | |
| 2007/0055743 A1 | 3/2007 | Pirtle et al. | |
| 2007/0079238 A1* | 4/2007 | Weinkauff | G06F 9/451 |
| | | | 715/764 |
| 2007/0102764 A1* | 5/2007 | Ando | H04N 21/4325 |
| | | | 348/E5.006 |
| 2007/0174415 A1 | 7/2007 | Cha et al. | |
| 2007/0289022 A1 | 12/2007 | Wittkotter | |
| 2008/0072271 A1* | 3/2008 | Wilson | H04N 21/4331 |
| | | | 386/E5.013 |
| 2008/0288973 A1 | 11/2008 | Carson et al. | |
| 2009/0083631 A1 | 3/2009 | Sidi et al. | |
| 2010/0214301 A1* | 8/2010 | Li | G06T 1/20 |
| | | | 345/522 |
| 2011/0066673 A1 | 3/2011 | Outlaw | |
| 2011/0307561 A1 | 12/2011 | Gao et al. | |
| 2012/0101981 A1* | 4/2012 | Arms | G06F 16/93 |
| | | | 707/E17.005 |
| 2012/0102118 A1* | 4/2012 | Arms | G06Q 10/1095 |
| | | | 709/205 |
| 2012/0102397 A1* | 4/2012 | Arms | G06F 16/93 |
| | | | 707/758 |
| 2012/0102560 A1* | 4/2012 | Arms | G06F 21/41 |
| | | | 726/8 |
| 2012/0260267 A1 | 10/2012 | Cucu et al. | |
| 2013/0347030 A1* | 12/2013 | Oh | H04N 21/8545 |
| | | | 725/32 |
| 2014/0115506 A1 | 4/2014 | George et al. | |
| 2014/0194105 A1 | 7/2014 | Lee et al. | |
| 2014/0327677 A1* | 11/2014 | Walker | G06F 16/95 |
| | | | 345/440 |
| 2015/0181293 A1 | 6/2015 | Olley | |
| 2017/0041392 A1 | 2/2017 | Volt | |
| 2017/0193069 A1* | 7/2017 | Newhouse | G06F 16/275 |
| 2019/0166148 A1 | 5/2019 | Eskandari et al. | |
| 2019/0354676 A1* | 11/2019 | Willis | H04L 9/321 |

OTHER PUBLICATIONS

International Search Report issued in PCT/US21/60496 dated Mar. 16, 2022.

Written Opinion issued in PCT/US21/60496 dated Mar. 16, 2022.

U.S. Appl. No. 17/101,873.

* cited by examiner

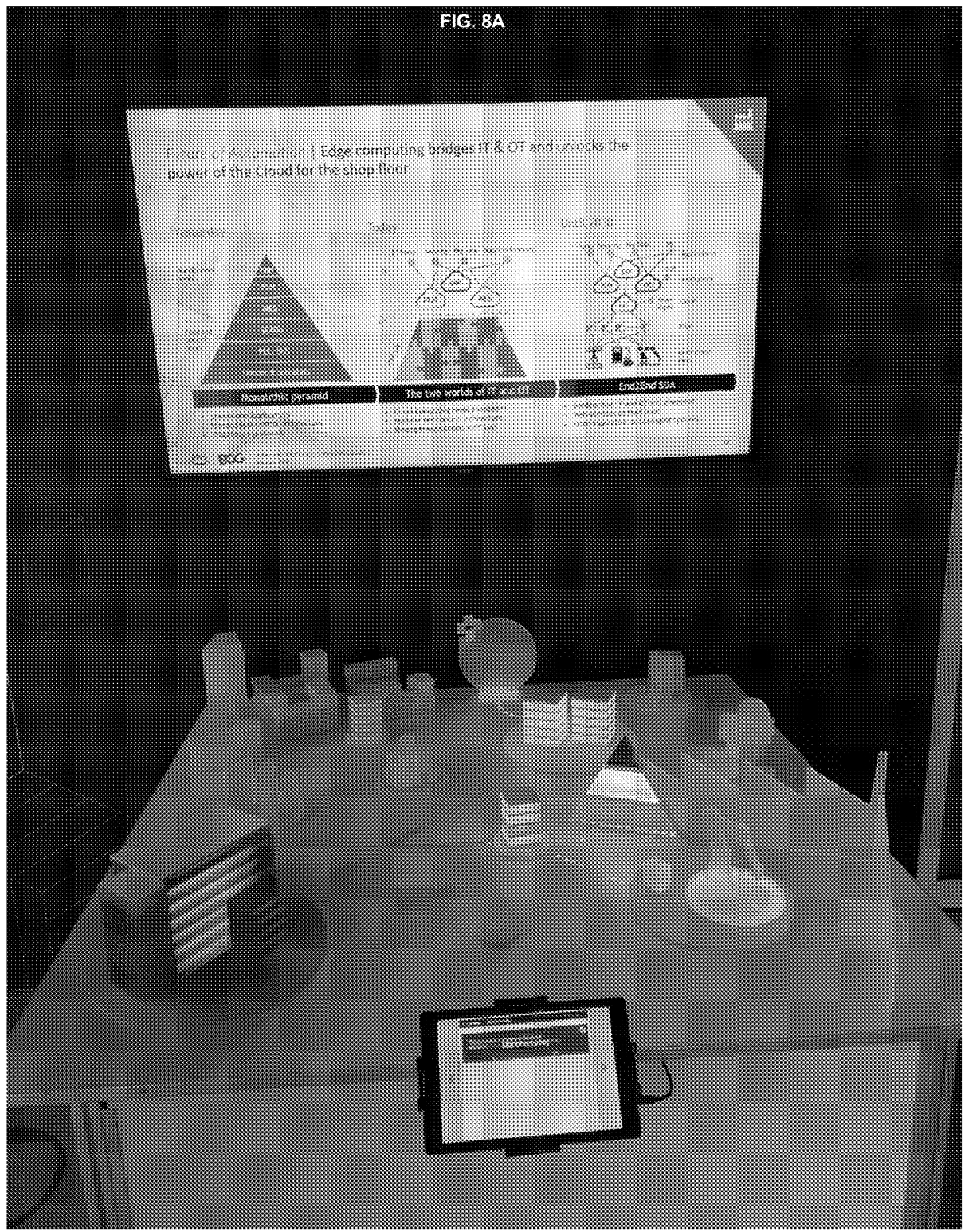

FIGURE 10A

Events:

1. Fully virtual

Participants: All in different locations, can join event virtually
Setup: Two screens

- First screen: VideoConference (Presentation); e.g. via Zoom, WebEx, ...
- Second screen: Mobile (Companion) Device, which can be controlled by Companion App (additional content)

2. Fully on-site/physical

Participants: can be in same location
Setup: Screen (Presentation) plus connected devices (e.g. technical demonstrator). State of connected devices can be synchronized to Presentation Content in a context-sensitive way.

3. Hybrid

Can be a combination of the previous scenarios. Some participants can be connected virtually, some can be in the same location. All participants can see the same Presentation (On-Site: Screen, Virtual: VideoConference on First Screen) and the same additional content (On-Site: via connected devices, Virtual: via Companion App on Second Screen / Mobile Device)

- Companion Script

A custom script language that can offer a simple but comprehensive syntax to both automate the control of events conducted with the Companion App Platform and manipulate & control objects in a Companion App Client synchronized in a context-sensitive way with a PowerPoint Presentation.
Commands provided by the script language can generally fall into one of two categories: Object Code and Event Code.

- Event Code

Event Code can be executed in a local interpreter within the Companion Desktop App and can be mapped to control commands that are sent to the cloud platform. It can e.g. change the active content module.

- Object Code

Object Code can be intended to manipulate & control an object in a Companion Client Application.

- Object

A digital (2nd Screen Application) or physical (IoT Application) object whose state can be controlled by a Companion Client Application via Companion script Commands (in Presentation). E.g. a digital 3D Model where individual elements can be animated or the camera can be moved, or physical RGB LEDs as well as sound can be played to underline certain activities.

FIGURE 10B

- Companion App Platform

The Companion App Platform can be the backend of the whole system. It can entail a set of APIs, Databases & Applications all running in a dedicated Environment (e.g. in cloud / on-premise servers).

- ○ User Management (Facilitator, Teams)

- Facilitator

Can be persons with access to the Admin Interface & Companion Desktop App. Able to create & manage events

- Team

A team can include multiple facilitators (members) and can provide access to shared events and a shared content library.

- User

Can be a participant of an event. User can be created automatically when joining an event; they may not need to register with the platform.

- ○ Content Library (Teams)

Each team can manage a content library for various media types (e.g. videos, virtual tours, etc.) for use within multiple events. Content in the library can be accessible by all team members and can also be shared with other teams. All content uploaded into the library can be automatically preprocessed by the platform to ensure it can be provided to users in the best possible format (e.g. videos are converted into multiple resolutions & bitrates).

- Content / Content Files

A set of one or more files for one specific content item; e.g. a virtual tour consists of multiple images, and even a video consists of multiple files in different resolutions and bitrates after the preprocessing step.

- ○ Event Controller

The API / Server managing all events and handling communications with facilitators & users.

- ○ Event

The representation of all data for an event on the server / in the database.
  Each event can be automatically assigned an unique event identifier and can have a configurable name, start & end date.
  In addition to this "meta data" an event can include the Content List, and the list of participants.

- Content Module

The Companion App can be based on an extensible modular architecture. Content Modules can encapsulate functionality to manage & visualize arbitrary content within an event.

FIGURE 10C

- Content Controller (e.g. "Player")
  The software module can be used by a Client Application to handle specific content. E.g. for the "Video" Content Module this can be the actual video player.

- Content List
  The list of all content modules chosen & configured for a single event. Each entry in the Content List can be a tuple (Content Module, Content).
  E.g. the "Video"-Module and a referenced video from the content library.

- Active Content Module
  The active content module can be shown by all clients connected to an event. Only a single entry from the Content List can be active at any time.

- Companion Admin Web Interface
The Companion Admin Web Interface can allow facilitators to manage teams, content and events.

- Manage Teams
  - Manage Content Library
  - Manage Event
    - Manage Content List

- Companion Desktop App
The Companion Desktop App can be used by facilitators to automatically synchronize a Presentation with an event using Companion Script embedded into the Presentation.
The App can monitor the active Presentation & extract the embedded Companion Script.
Event Code can be executed locally within the app, and Object Code can be sent to the Companion App Platform for distribution to Users.

- Presentation (e.g. in PowerPoint, Keynote, OpenOffice)
    - Create, Edit, Save ppt
    - Write Script (Event, Object) by using the comment feature within a Presentation Software

- Companion Client Application
There can be two types of client applications:
  1. 2nd screen application for end users
  2. IoT applications for connected devices

- 2nd Screen Applications (Web Interfaces)
  The web interface can be used by virtual participants of an event (users).
  It can be intended to be opened on mobile device (2nd Screen), but can run in any web browser on any internet connected device.
  The web interface can support all Content Modules.

- IoT Applications (Connected Devices)
  This type of client application can run on connected devices. It can synchronize the state of physical objects to Presentation Content in a context-sensitive way. These applications may only support a subset of content modules. They may only be active while a supported content module is active within an event and otherwise may use a default fallback state.

METHODS AND SYSTEMS FOR CONTEXT-SENSITIVE MANIPULATION OF AN OBJECT VIA A PRESENTATION SOFTWARE

CROSS REFERENCE TO RELATED APPLICATIONS

This application is a Divisional of U.S. Patent Application No. 17/101,873, filed Nov. 23, 2020. The entirety of this application is incorporated herein by reference.

FIELD

The present disclosure relates to methods and systems for context-sensitive manipulation of an object via a presentation software.

BRIEF DESCRIPTION OF DRAWINGS

This application/patent contains at least one drawing executed in color. Once this application/patent is published, copies of this patent application with color drawing(s) will be provided by the US PTO upon request and payment of the necessary fee.

Other objects and advantages of the present disclosure will become apparent to those skilled in the art upon reading the following detailed description of example embodiments, in conjunction with the accompanying drawings, in which like reference numerals have been used to designate like elements, and in which:

FIGS. 8A-8E illustrate various object states according to an example embodiment of the present disclosure.

FIGS. 10A-10C provides infrastructure information according to an example embodiment of the present disclosure.

DESCRIPTION

Figure 1:
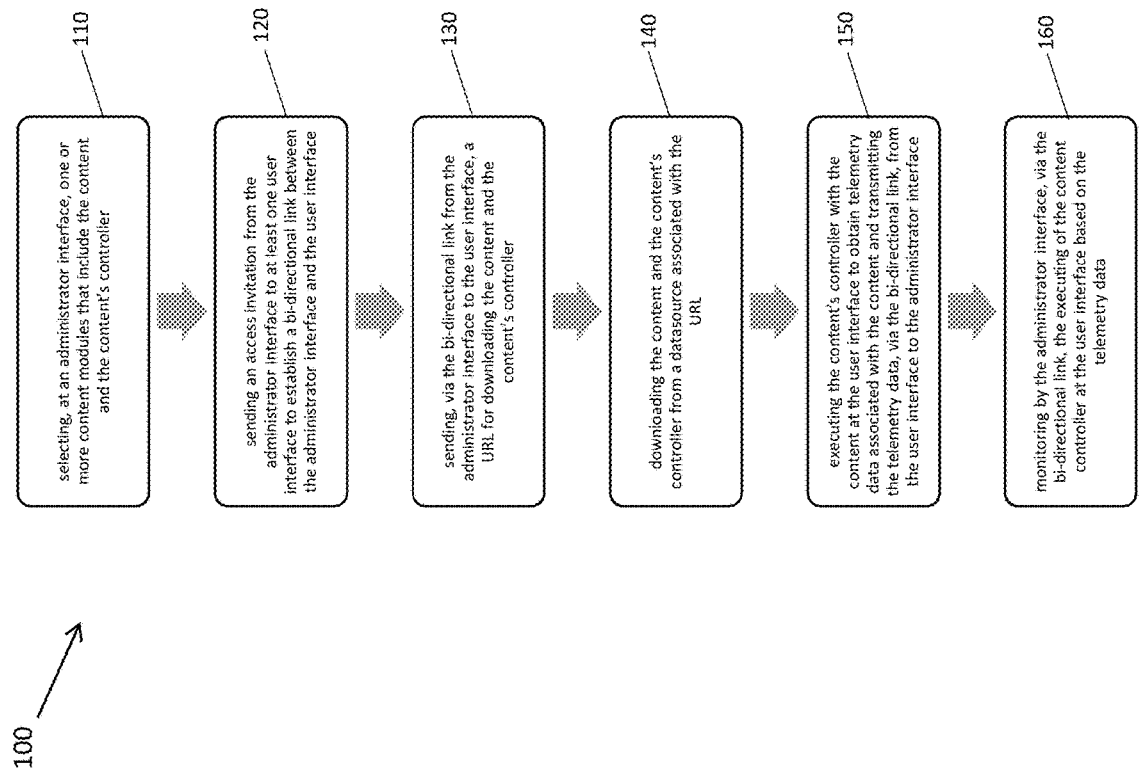
FIG. 1 shows a flowchart for executing and monitoring content in a decentralized runtime environment according to an example embodiment of the present disclosure.

FIG. 1 shows a flowchart for an example method 100 for executing and monitoring content in a decentralized runtime environment. The method 100 may include a step 110 of selecting, at an administrator interface, one or more content modules that include the content and the content's controller.

Content, as used herein, can include textual data, visual (e.g. images and videos) data, aural data, IoT data, transactional data, etc. It may also include content derived from this data such as embedded websites (or a website URL), 3D models, polling/questions/voting data, and/or scenes from a virtual tour. The content can be preprocessed. For example, videos can be transcoded into various formats for different devices and connectivity.

In an example embodiment, a content library for various media types (e.g. videos, virtual tours, etc.) can be used. Content uploaded into the library can be automatically preprocessed by the platform to ensure it can be provided in the best possible format (e.g. videos are converted into multiple resolutions & bitrates).

Content controller, as used herein, can include a software application to execute/run the content. For example, an image viewer can be used for an image-based content, a video player can be used for video content, a web browser can be used for website-based content, etc.

The method 100 may include a step 120 of sending an access invitation from the administrator interface to at least one user interface to establish a bi-directional link between the administrator interface and the user interface. The bi-directional link or connection can be a direct connection or via a server connecting the administrator interface and the user interface. The connecting server can entail set of APIs, databases & applications running in a dedicated environment (e.g. in cloud/on-premise servers).

The step 120 can be performed via many ways such as emailing the access invitation, texting the access invitation, and/or sharing it over a video conference, etc. The access invitation can be in the form of, but is not limited to, a QR code and/or a URL. The URL may itself contain information regarding an access code or it may provide a webpage with a field to input the access code. The user interface can be one or more interfaces that do not have administrator privileges.

The administrator interface can be an interface for an administrator with privileges that can affect other users of the decentralized runtime environment. Such privileges can include changing security settings, install software and hardware, access all files on the computer, make changes to other user accounts, etc. In an example embodiment, the administrator interface and the one or more user interfaces can be displayed on different devices. In another example embodiment, the administrator interface and the user interfaces can be displayed on the same device.

The method 100 may include a step 130 of sending, via the bi-directional link from the administrator interface to the user interface(s), a URL for downloading the content and the content's controller. The method 100 may include a step 140 of downloading the content and the content's controller from a data source (e.g. server, app store, and/or webpage) associated with the URL.

In an example embodiment, the content's controller may already be present on a device associated with the user interface. In such a case, the content controller may not have to be downloaded. In an example embodiment, the content's controller may be transmitted from a device associated with the administrator interface to a device associated with the user interface, without being downloading from the data source.

The method 100 may include a step 150 of executing the content's controller with the content at the user interface to obtain telemetry data associated with the content and transmitting the telemetry data, via the bi-directional link, from the user interface to the administrator interface. In an example embodiment, during the executing of the content's controller in step 150, additional user interface(s) may connect to the administrator via the access invitation and bi-directional link in the same manner as previously described in steps 130 and 140. The telemetry data can be stored in an external server and/or a device associated with the administrator interface.

The method 100 may include a step 160 of monitoring by the administrator interface, via the bi-directional link, the executing of the content controller at the user interface based on the telemetry data. For example, if the content is a video file, the administrator interface can monitor the progress of video playback at the user interface and as necessary control and synchronize the video playback across one or more user interfaces. This step 160 can be repeated one or more times as telemetry data is updated based on the executing step 150. After the step 160, the method 100 can be terminated by ending the executing of the content's controller and disconnecting all the user interfaces from the administrator interface.

Figure 2:
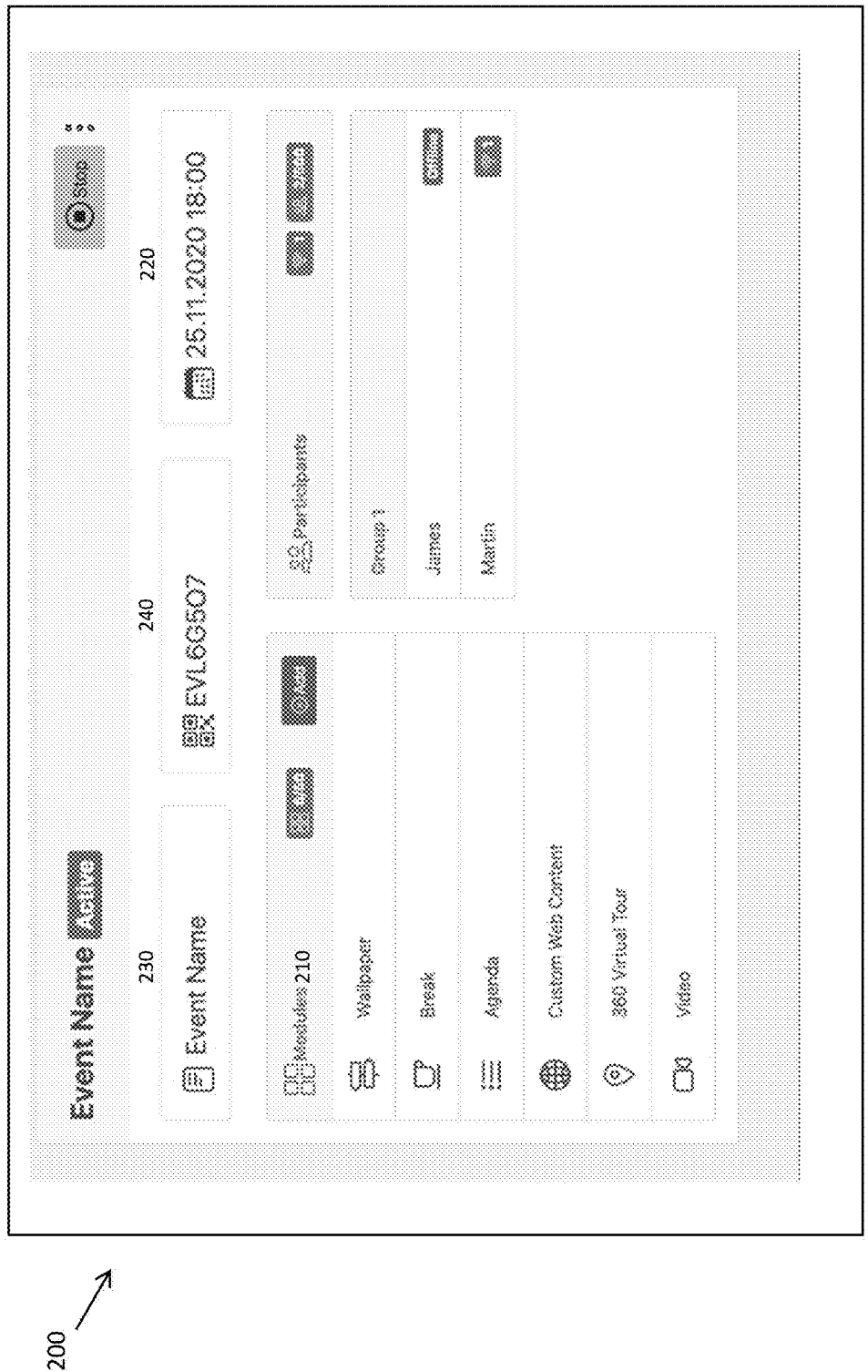
FIG. 2 shows an administrator interface with an ordered list of multiple content modules according to an example embodiment of the present disclosure.

FIG. 2 shows an example administrator interface 200 with an ordered list 210 of multiple content modules that can be arranged such that each content module contains a different type of content or functionality. The content modules in the list 210 are "Welcome", "Agenda", "Video", "Virtual Tour", "Demonstrator: Face Detection", "Co-Creation: Photos Upload", "Co- Creation: Card Browser", "Custom".

These are non-limiting examples merely for illustration purposes. Other non-limiting examples can include content modules that allows users to upload content such as images, videos, etc., or content modules that enhance content with additional information (e.g. detect text on an image or faces/persons). The order of content modules in the list 210 may be changed by using, for example, drag and drop functionality.

By specifying a start/end time 220, a title 230 and a list of content modules (e.g. 210), a new event can be created at the administrator interface 200. An access invitation 240 (e.g. QR code/identifier) associated with the new event can be auto generated. As previously described in step 120, this access invitation can be used to establish a bi-directional link. Event related data (e.g. content modules 210, start/end time 220, a title 230, etc.) can be stored in an external server and/or a device associated with the administrator interface.

Previously described steps 150 and 160 can include executing and monitoring a selected group of content modules from the list content modules. For example, if the administrator interface intends to execute and monitor only the "Video" and "Virtual Tour module" in the list 210, then it can be done by selecting only those specific modules.

Figure 3:
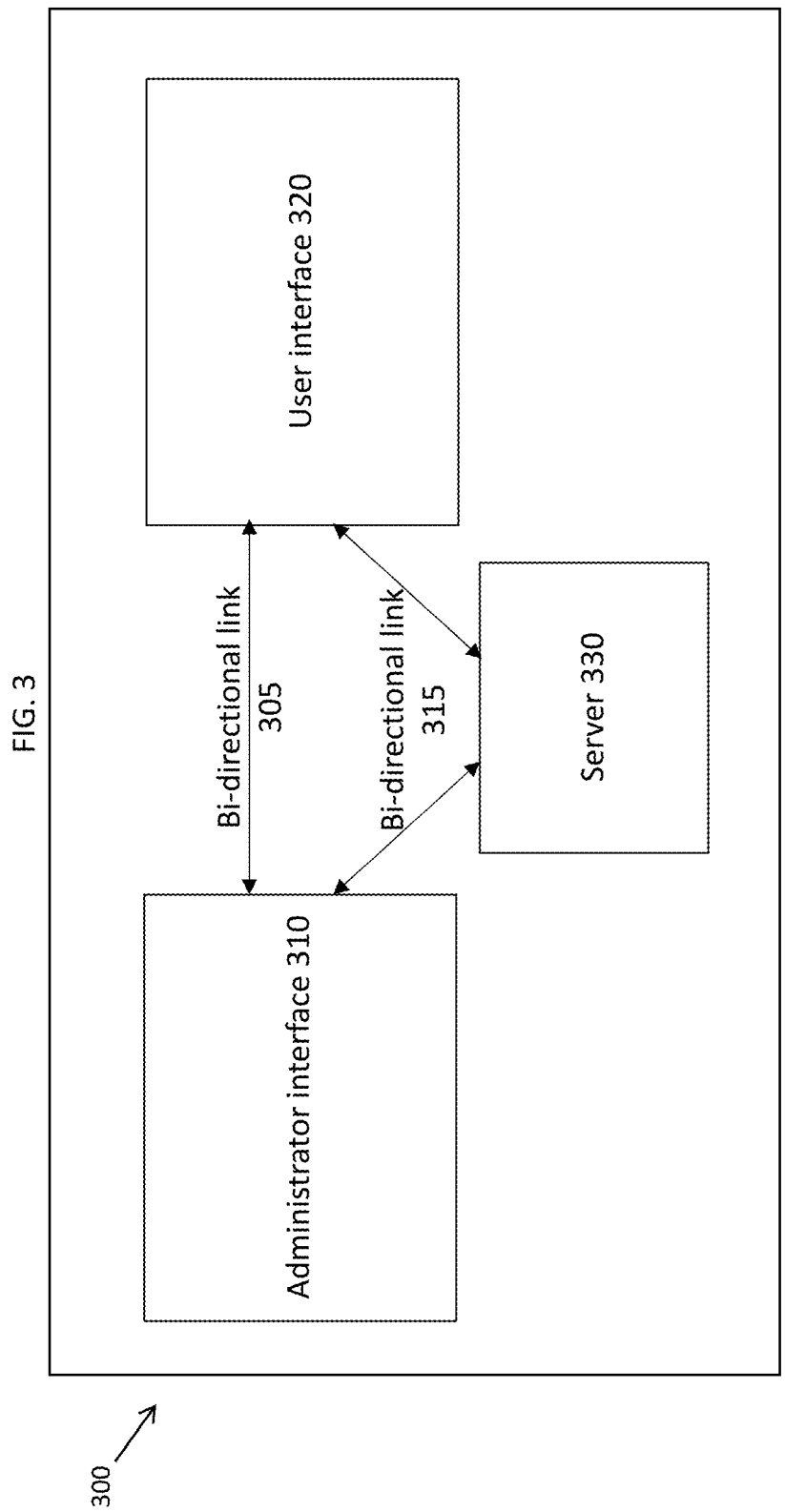
FIG. 3 shows a system diagram for executing and monitoring content in a decentralized runtime environment according to an example embodiment of the present disclosure.

FIG. 3 shows an example diagram of a system 300 for executing and monitoring content in a decentralized runtime environment. The system 300 can include an administrator interface 310 configured to select at least one content module that includes the content and the content's controller and transmit an access invitation for establishing a bi-directional link 305 or 315. Aspects of the administrator interface 310 relate to previously described steps 110, 120 and 130.

The system 300 can include a user interface(s) 320 connected to the administrator interface 310 via the bi-directional link 305 or 315. The user interface 320 can be configured to receive a URL for downloading the content and the content's controller. The user interface 320 can be further configured to execute the content's controller with the content to obtain telemetry data associated with the content, transmit the telemetry data, via the bi-directional link 305 or 315, from the user interface 320 to the administrator interface 310. Aspects of the administrator interface 310 relate to previously described steps 130, 140 and 150. The execution of the content's controller by the user interface 320 can be monitored at the administrator interface 310, as previously described in step 160.

In an example embodiment, the bi-directional link 305 can be established via a direct connection between the administrator interface 310 and the user interface 320. In another example embodiment, the bi-directional link 315 can be established via a server 330 between the administrator interface 310 and the user interface 320.

Figure 4:
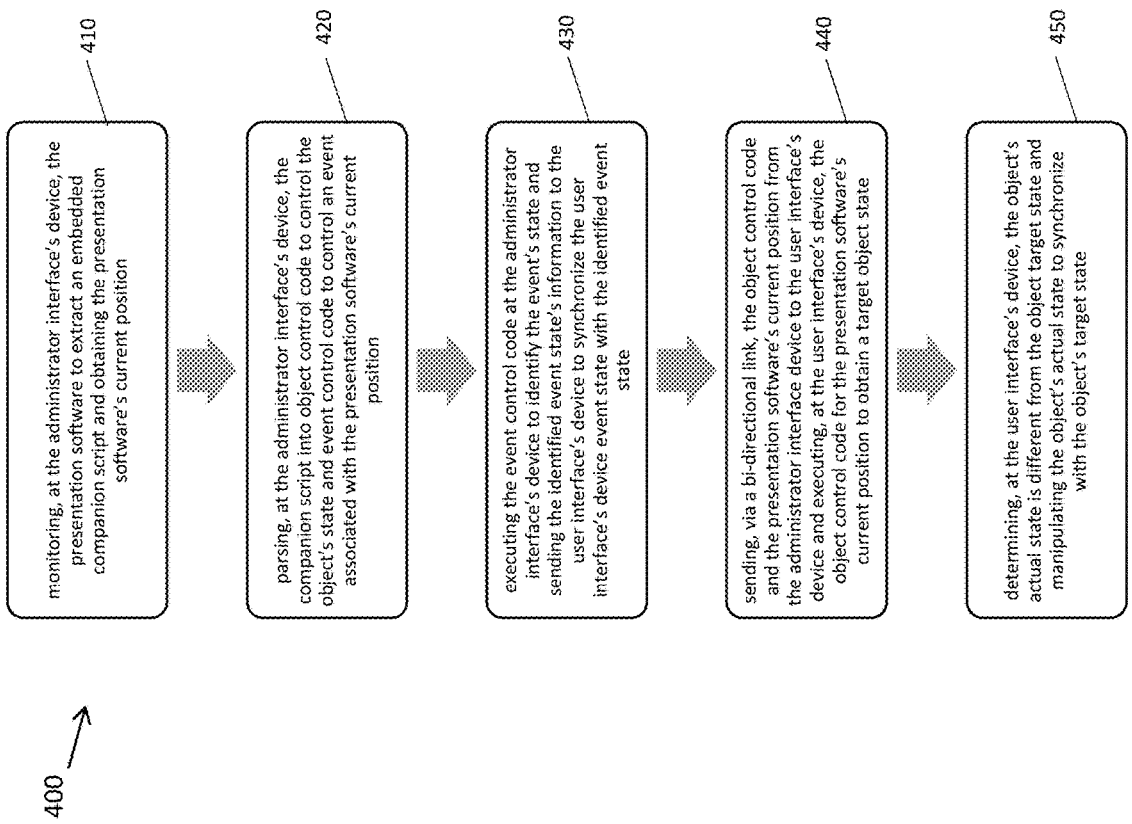
FIG. 4 shows a flowchart for context-sensitive manipulation of an object according to an example embodiment of the present disclosure.

FIG. 4 shows a flowchart for a method 400 for context-sensitive manipulation of an object via a presentation software. The object can be a virtual object (e.g. a digital 3D model) or a physical object (e.g. an IoT Application controlling one or more actuators/physical items). The context-sensitive manipulation can be accomplished by controlling/changing/manipulating a state of the object.

In an example embodiment, the controlling/changing/manipulating can include animating 3D virtual objects and/or controlling physical mechatronic systems or actuators. the change in the state of the object can include, for example, animating individual elements in a 3D model, changing a camera's position to set a viewpoint, changing color of physical RGB LEDs, changing a speaker's sound or playlist to underline certain activities. The change in the state of the object does not include changes related to the presentation software's progress or changes in the companion script.

The method 400 can be used to enrich both virtual & onsite/physical events (meetings) in which a presentation is shown via a presentation software (e.g. PowerPoint, Keynote, OpenOffice) with additional (interactive) content to create a more immersive and engaging experience.

In an example embodiment, the method 400 can be implemented in a fully virtual scenario. In such a scenario, all participants (e.g. administrator interface's device and user interface's device(s)) can be at different locations connected virtually. The administrator interface's device can execute the presentation software and control aspects of the user interface's device.

In another example embodiment, the method 400 can be implemented in a fully on-site/physical scenario. In such a scenario, all participants (e.g. administrator interface's device and connected user interface's device (e.g. IoT devices) can be at the same location. The connected IoT devices can be synchronized with the presentation software's position in a context-sensitive manner.

In another example embodiment, the method 400 can be implemented in a combination of the previous scenarios. That is, some participants can be connected virtually, and some can be in the same location. All participants can view the same presentation (on-site: screen, virtual: video conference on a screen) and the same additional content (on-site: via connected devices, virtual: via Companion App on Second Screen/Mobile Device).

The method 400 can include a step 410 of monitoring, at the administrator interface's device, the presentation software to extract an embedded companion script and obtaining the presentation software's current position. Known techniques of extraction of an embedded script can be used for step 410.

In an example embodiment, the companion script can be a custom script language that provides a syntax to both automate control of events conducted at the administrator interface and manipulate and/or control objects associated with the user interface device(s) synchronized in a context-sensitive way via the presentation software. The companion script can be embedded in a file associated with the presentation software.

The method 400 can include a step 420 of parsing, at the administrator interface's device, the companion script into object control code to control the object's state and event control code to control an event associated with the presentation software's current position. Known techniques of parsing can be used for step 420.

The object control code can manipulate and/or control the object associated with the user interface's device. The event control code can be executed by the administrator interface's device and can be mapped to control commands sent to the user interface. The event control code can modify the event state (e.g. a content module(s)) based on the presentation software's current position. The presentation software can serve as an Integrated Developer Environment (IDE) to define logic to manipulate and control both the event as well as the object.

The method 400 can include a step 430 of executing the event control code at the administrator interface's device to identify the event's state (e.g., content module) and sending the identified event state's information to the user interface's device. For example, the event control code can modify any parameters associated with an event as previously described with regards to FIG. 2 (e.g. content module, name of event, start/stop/disconnect, order of content module etc.). This step can happen automatically providing a better and efficient user experience.

In an example embodiment, if the event state at the user interface's device is not the same as the identified event state, the step 430 can further include synchronizing the user interface's device event state with the identified event state based on the identified event state's information.

The method 400 can include a step 440 of sending, via a bi-directional link, the object control code and the presentation software's current position from the administrator interface device to the user interface's device and executing, at the user interface's device, the object control code for the presentation software's current position to obtain a target object state. The bi-directional link can be established as previously described in method 100.

The method 400 can include a step 450 of determining, at the user interface's device, the object's actual state is different from the object target state and manipulating the object's actual state to synchronize with the object's target state. For example, for a virtual 3d scene object with two different buildings, the state of the object can be defined by parameters that include camera positioning and color of lights at each of the two buildings. The object's actual state can be the camera is turned off, building no. 1 is green color, and building no. 2 is red color. The target state can be a camera focused on the data center of the virtual building, building no. 1 in red color and building 2 in green color. Per step 450, in this example because the object's target state is different from the object's actual state, the object's state would be changed to the target state.

In an example embodiment, the object may include multiple sub-objects. For example, in the previous example, the virtual 3d scene object has sub-objects as camera, building no. 1 and building no. 2. The method 400 can be implemented for each of the sub-objects in a similar manner as the object.

In an example embodiment, the presentation software and the administrator interface can be performed at different devices (e.g. the presentation software is not executed at the administrator interface's device). In such a case, these different devices can be connected via a bi-directional link and one or more steps of the method 400 can be performed at the presentation software's device.

Figure 5:
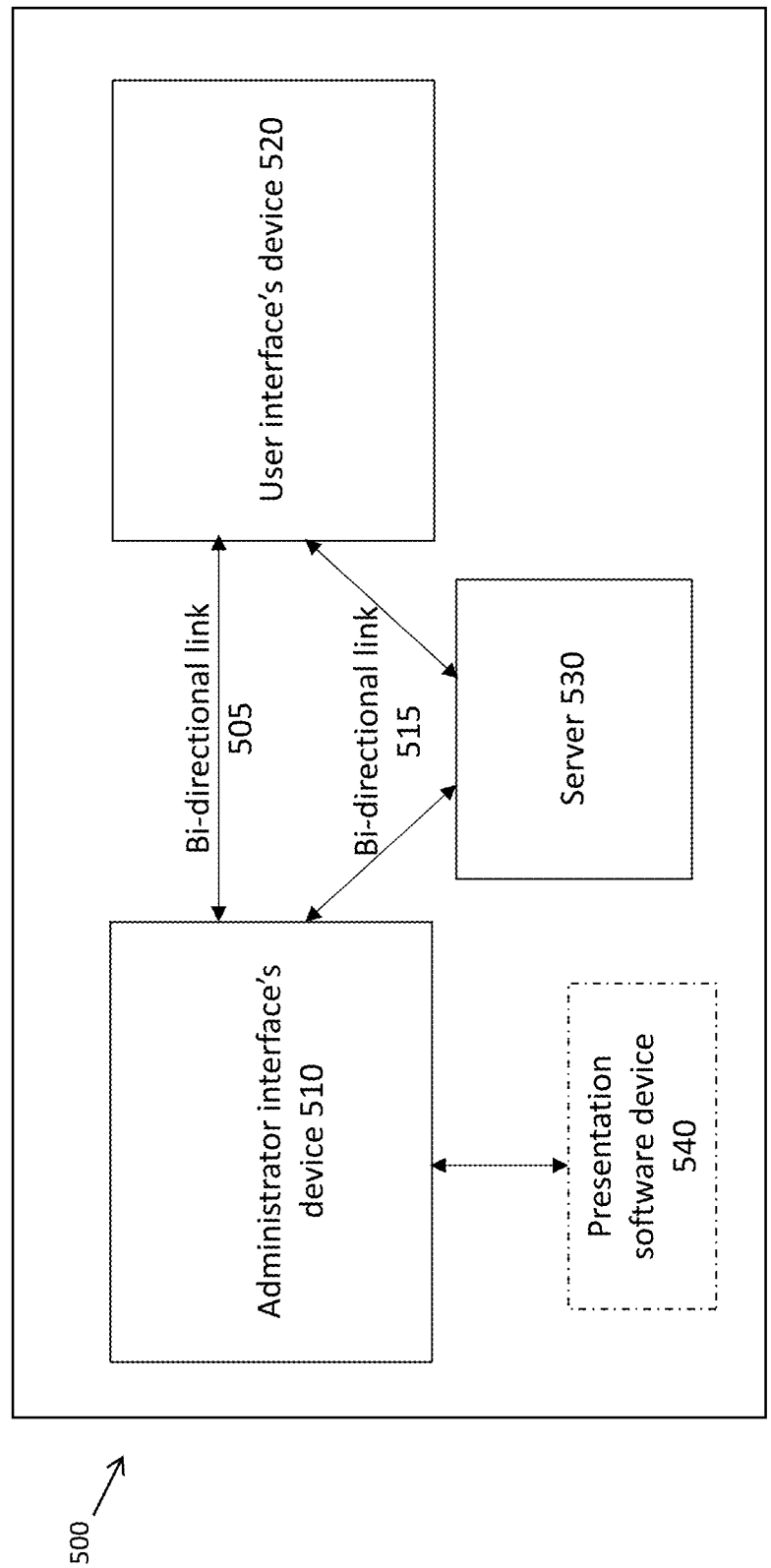
FIG. 5 shows a system diagram for context-sensitive manipulation of an object according to an example embodiment of the present disclosure.

FIG. 5 shows an example system 500 for context-sensitive manipulation of an object via a presentation software. The system 500 can include an administrator interface's device 510 configured for monitoring the presentation software to extract an embedded companion script and obtaining the presentation software's current position. The administrator interface's device 510 can parse the companion script into object control code to control the object's state and event control code to control an event associated with the presentation software's current position. The administrator interface's device 510 can execute the event control code to identify the event's state and send the identified event state's information. These aspects of the administrator interface's device 510 relate to previously described steps 410, 420 and 430.

The system 500 can include a user interface's device(s) 520 configured to receive, via the bi-directional link 505 or 515, the identified event state's information, the object control code and the presentation software's current position from the administrator interface's device 510. The user interface's device(s) 520 can execute the object control code for the presentation software's current position to obtain a target object state. The user interface's device 520 can then determine that the object's actual state is different from the object target state and manipulate the object's actual state to synchronize with the object's target state. These aspects of the user interface's device(s) 520 relate to previously described steps 440 and 450.

In an example embodiment, the presentation software can be executed at the administrator interface's device 510. In another example embodiment, the presentation software can be executed at a device (e.g. presentation software device 540) that is different from the administrator interface's device 510.

In an example embodiment, the bi-directional link 505 can be established via a direct connection between the administrator interface's device 510 and the user interface's device 520. In another example embodiment, the bi-directional link 515 can be established via a server 530 between the administrator interface's device 510 and the user interface's device 520.

Figure 6:
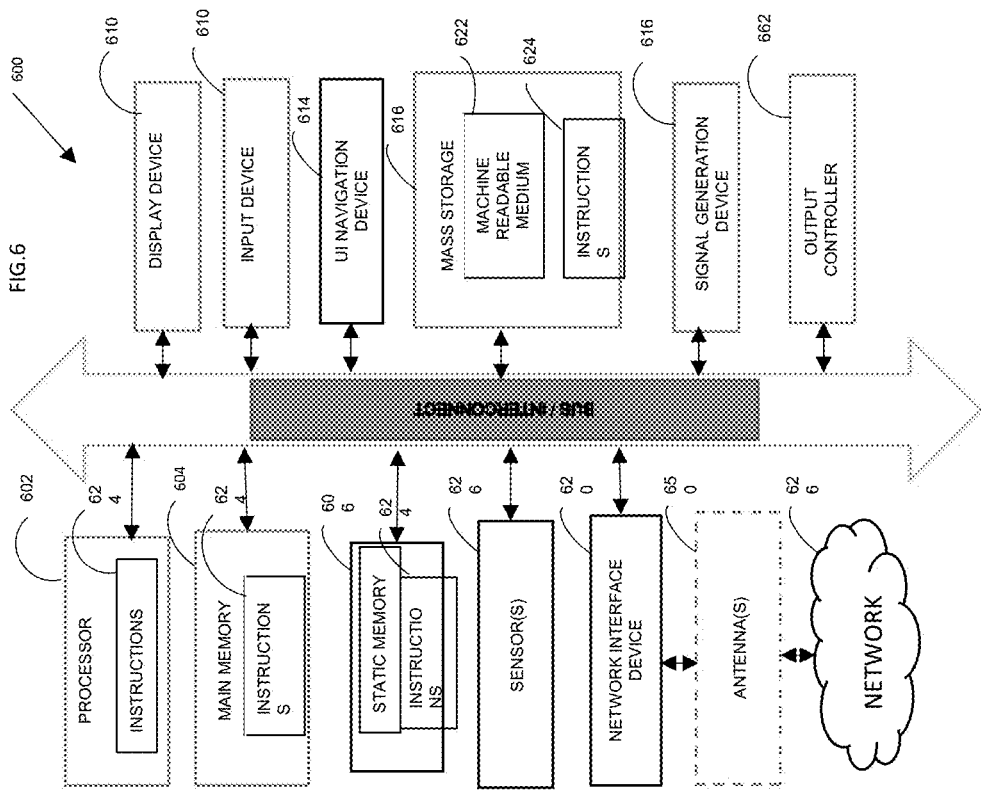
FIG. 6 illustrates a machine configured to perform computing operations according to an embodiment of the present disclosure.

FIG. 6 is a block diagram illustrating an example computing system 600 upon which any one or more of the methodologies (e.g. systems 300, 500 and methods 100, 400) discussed herein may be run according to an example described herein. Computer system 600 may be embodied as a computing device, providing operations of the components featured in the various figures of the present disclosure, including any processing or computing platform or component described or referred to herein. In alternative embodiments, the computing system 600 can operate as a stand-alone device or may be connected (e.g., networked) to other devices. In a networked deployment, the computing system 600 may operate in the capacity of either a server or a client machine in server-client network environments, or it may act as a peer machine in peer-to-peer (or distributed) network environments.

Example computing system 600 can includes a processor 602 (e.g., a central processing unit (CPU), a graphics processing unit (GPU) or both), a main memory 604 and a static memory 606, which communicate with each other via an interconnect 608 (e.g., a link, a bus, etc.). The computer system 600 may further include a video display unit 610, an alphanumeric input device 612 (e.g., a keyboard), and a user interface (UI) navigation device 615 (e.g., a mouse). In one embodiment, the video display unit 610, input device 612 and UI navigation device 615 are a touch screen display. The computer system 600 may additionally include a storage device 616 (e.g., a drive unit), a signal generation device 618 (e.g., a speaker), an output controller 632, and a network interface device 620 (which may include or operably communicate with one or more antennas 630, transceivers, or other wireless communications hardware), and one or more sensors 628.

The storage device 616 can include a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 constituting machine-readable media.

While the machine-readable medium 622 is illustrated in an example embodiment to be a single medium, the term "machine-readable medium" may include a single medium or multiple medium (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, 4G and 5G, LTE/LTE-A or WiMAX networks). The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system architecture 600 of the processing system may be client-operated software or be embodied on a server running an operating system with software running thereon. While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Figure 7:
FIG. 7 illustrates various object states according to an example embodiment of the present disclosure.
Figure 8C:
Figure 8D:
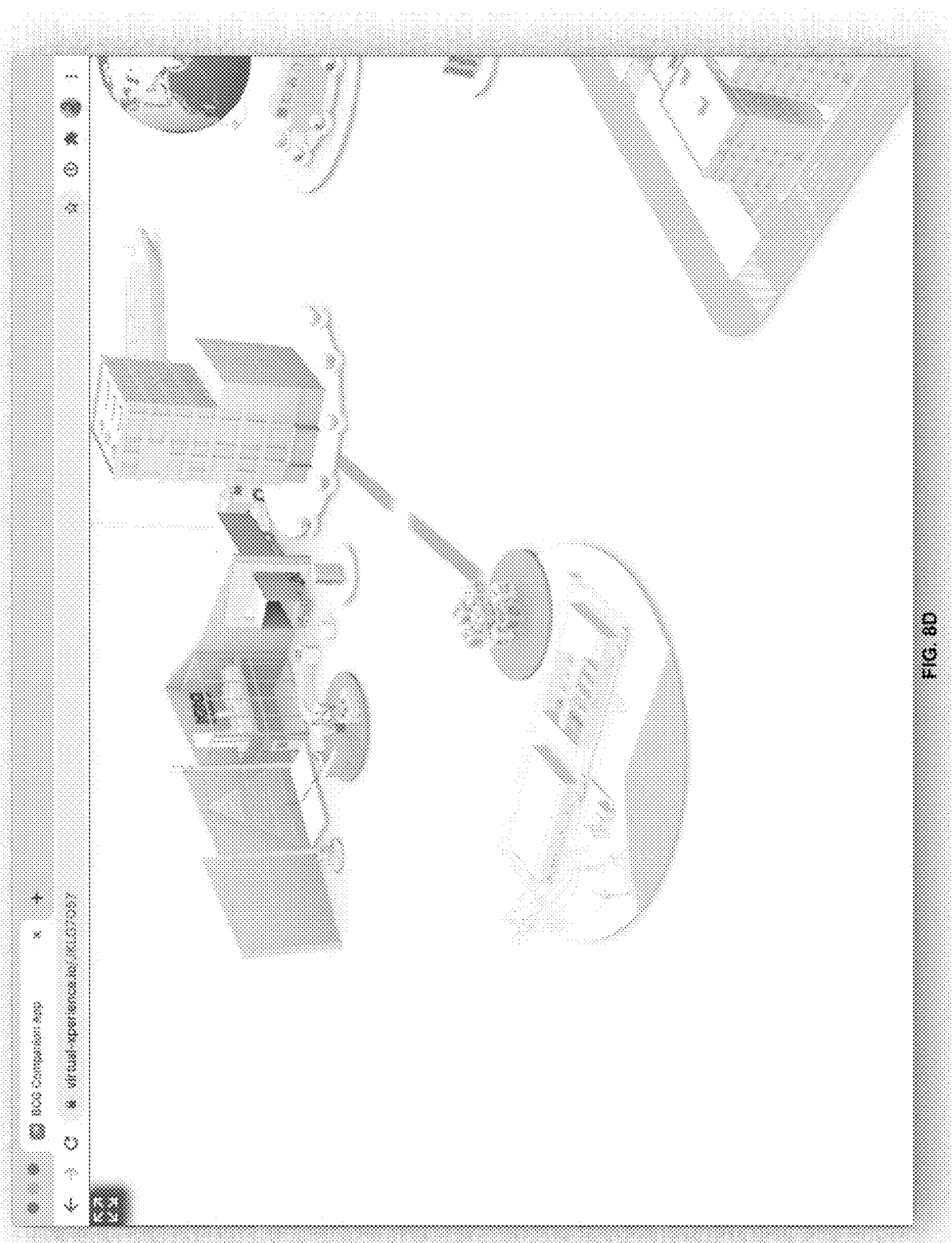
Figure 8E:
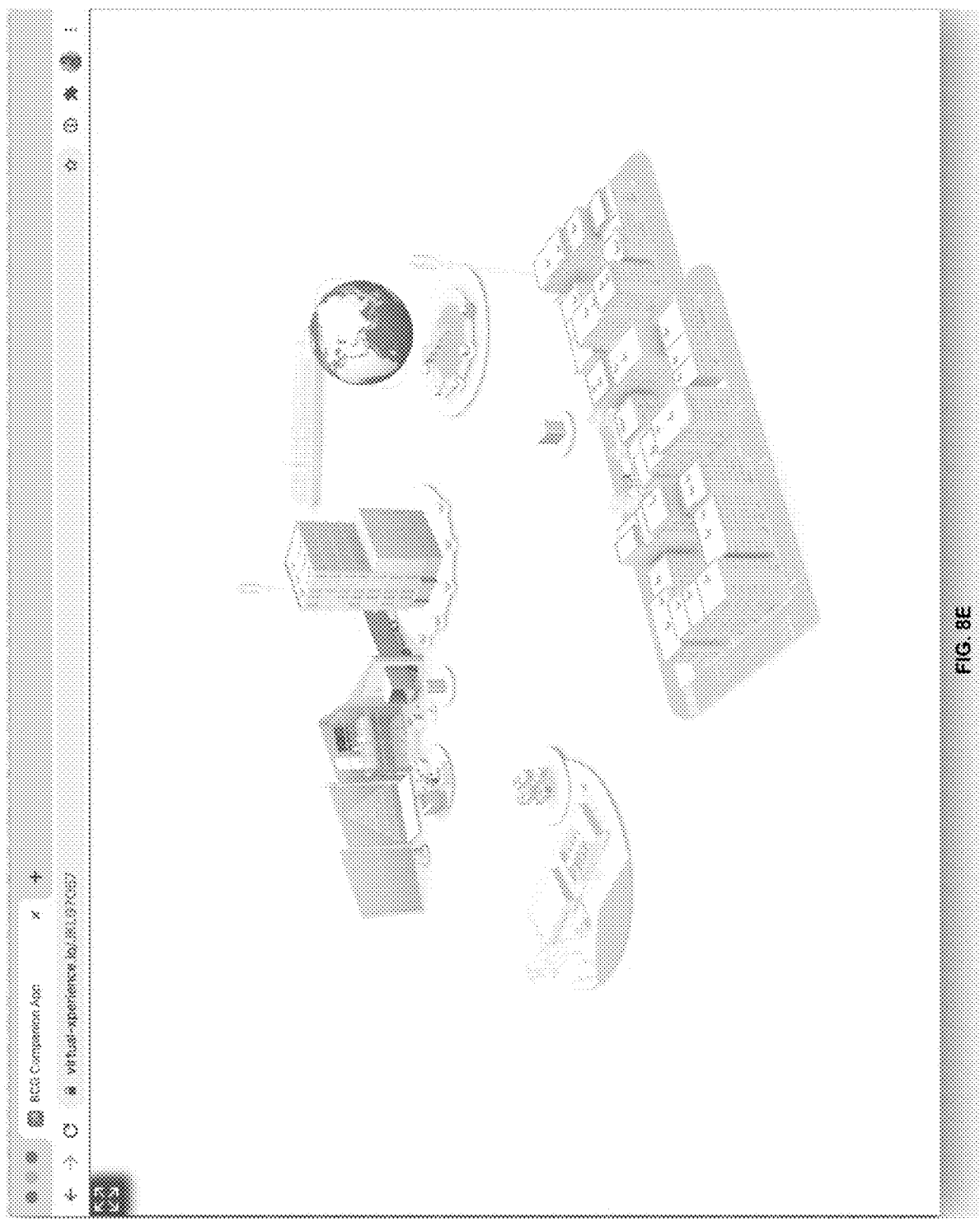
Figure 9A:
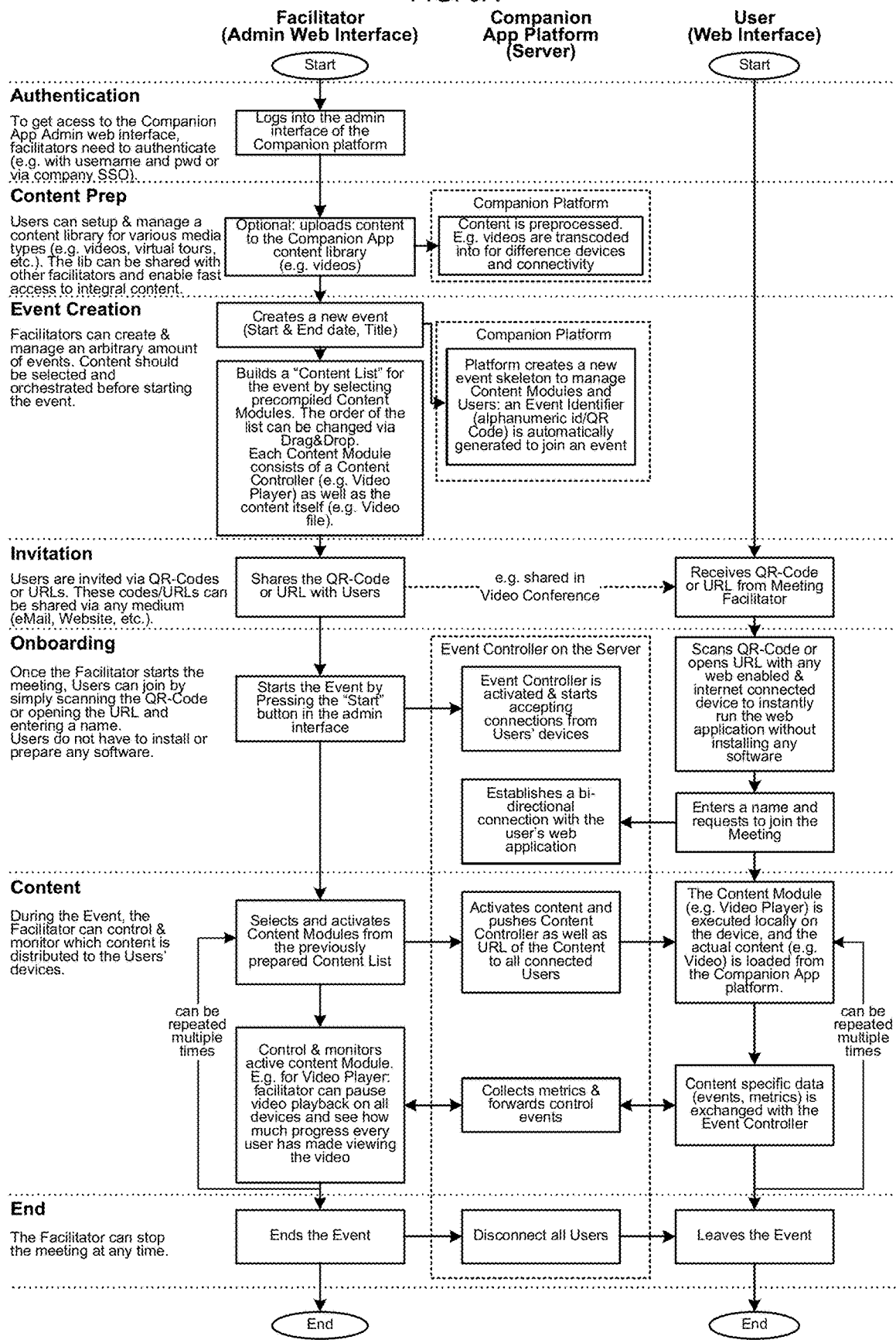
FIG. 9A-9B illustrates detailed flowcharts according to an example embodiment of the present disclosure.
Figure 9B:
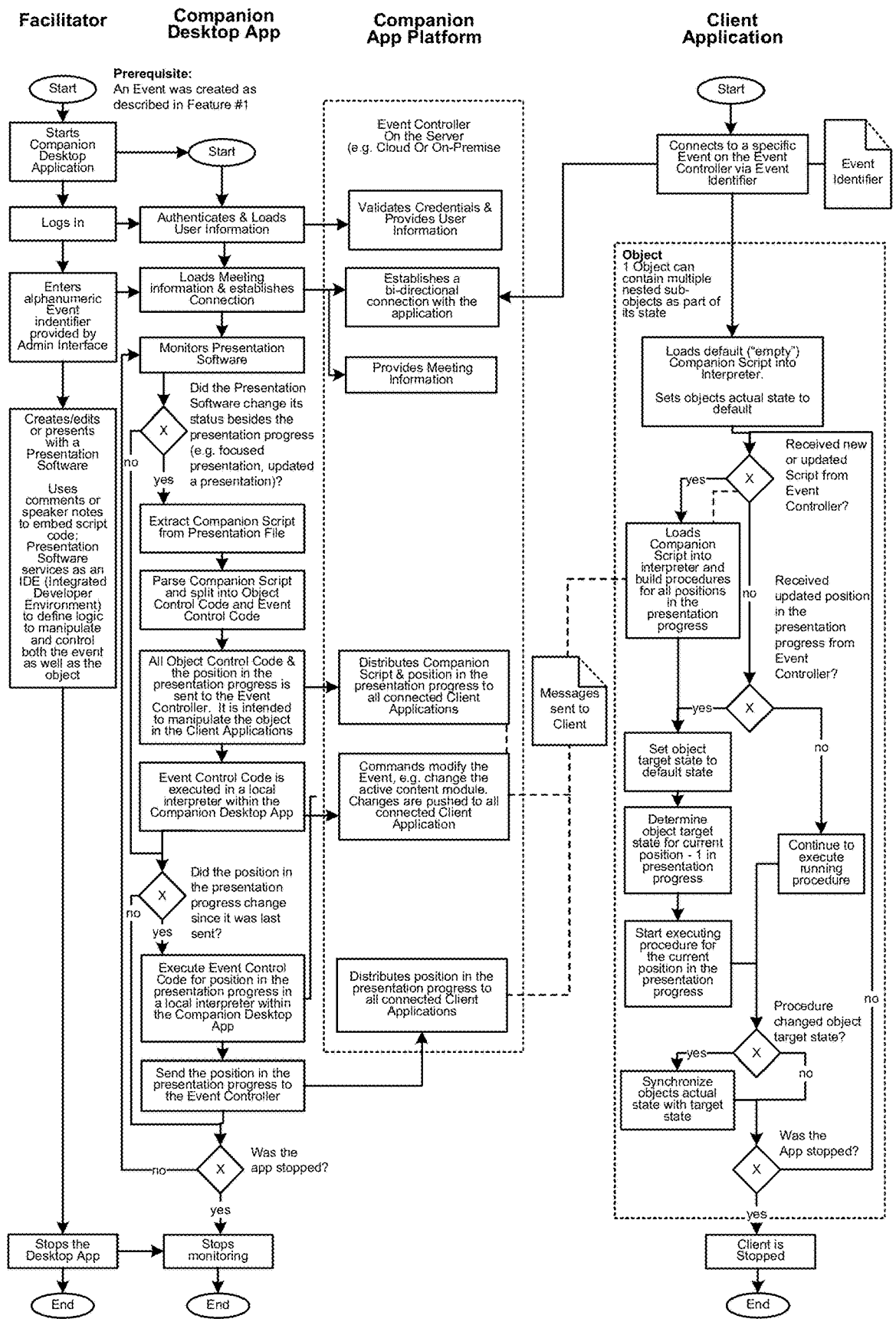

FIG. 7 illustrates various object states according to an example embodiment of the present disclosure. FIGS. 8A-8E illustrate various object states according to an example embodiment of the present disclosure. FIG. 9A-9B illustrates detailed flowcharts according to an example embodiment of the present disclosure. FIGS. 10A-10C provides infrastructure information according to an example embodiment of the present disclosure.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

Additional examples of the presently described method, system, and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for context-sensitive manipulation of an object via a presentation software, the method comprising:
   monitoring, at an administrator interface device, the presentation software to extract an embedded companion script and obtaining a current position of the presentation software;
   parsing, at the administrator interface device, the embedded companion script into an object control code that controls an object's state and event control code that controls an event associated with the current position of the presentation software;
   executing the event control code at the administrator interface device to identify a state of the event;
   sending, via a bi-directional link, information regarding the state of the event from the administrator interface device to a user interface device;
   sending, via the bi-directional link, the object control code and the current position of the presentation software from the administrator interface device to the user interface device
   synchronizing an event state of the user interface device based on the information regarding the state of the event received from the administrator interface device;
   executing, at the user interface device, the object control code for the current position of the presentation software to obtain a target object state; and
   determining, at the user interface device, that an actual state of the object is different from the target object state; and
   manipulating, at the user interface device, the actual state of the object to synchronize with the target object state.

2. The method of claim 1, wherein the presentation software is executed at the administrator interface device.

3. The method of claim 1, wherein the presentation software is executed at a device that is connected to the administrator interface device.

4. The method of claim 1, wherein the embedded companion script provides a syntax to control the event from the administrator interface device.

5. The method of claim 1, wherein the embedded companion script provides a syntax to control the object at the user interface device.

6. The method of claim 1, wherein the object is a virtual object.

7. The method of claim 1, wherein the object is a physical object.

8. The method of claim 1, wherein the object includes multiple sub-objects.

9. The method of claim 8, wherein the object is a virtual 3D scene and the sub-objects include a camera and one or more buildings associated with a virtual 3D scene.

10. A system for context-sensitive manipulation of an object via a presentation software, the system comprising:
    an administrator interface device configured to:
    monitor a presentation software to extract an embedded companion script to obtain a current position of the presentation software,
    parse the embedded companion script into an object control code that controls an object's state and event control code that controls an event associated with the current position of the presentation software,
    execute the event control code to identify a state of the event, and
    transmit, via a bi-directional link, information regarding the state of the event; and
    a user interface device configured to:
    receive the information regarding the state of the event from the administrator interface device,
    synchronize an event state of the user interface device based the state of the event information received from the administrator interface device,
    execute the object control code for the current position of the presentation software to obtain a target object state,
    determine that an actual state of the object is different from the target object state, and
    manipulate the actual state of the object to synchronize with the target object state.

11. The system of claim 10, wherein the presentation software is executed at the administrator interface device.

12. The system of claim 10, wherein the presentation software is executed at a device that is connected to the administrator interface device.

13. The system of claim 10, wherein the embedded companion script provides a syntax to control the event from the administrator interface device.

14. The system of claim 10, wherein the embedded companion script provides a syntax to control the object at the user interface device.

15. The system of claim 10, wherein the object is a virtual object.

16. The system of claim 10, wherein the object is a physical object.

17. The system of claim 10, wherein the object includes multiple sub-objects.

18. The system of claim 17, wherein the object is a virtual 3D scene and the sub-objects include a camera and one or more buildings associated with a virtual 3D scene.

\* \* \* \* \*